United States Patent
Lee

(10) Patent No.: US 9,341,885 B2
(45) Date of Patent: May 17, 2016

(54) DUAL-VIEW DISPLAY SYSTEM COMPRISING A FIRST AND SECOND ELECTRO-HOLOGRAPHIC OPTICAL ELEMENT

(75) Inventor: Se Kyu Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 317 days.

(21) Appl. No.: 13/883,167

(22) PCT Filed: Aug. 17, 2011

(86) PCT No.: PCT/KR2011/006054
§ 371 (c)(1),
(2), (4) Date: May 8, 2013

(87) PCT Pub. No.: WO2012/060543
PCT Pub. Date: May 10, 2012

(65) Prior Publication Data
US 2013/0222734 A1    Aug. 29, 2013

(51) Int. Cl.
*G02F 1/1335*    (2006.01)
*G02F 1/13*    (2006.01)

(52) U.S. Cl.
CPC ............ *G02F 1/1336* (2013.01); *G02F 1/1323* (2013.01)

(58) Field of Classification Search
CPC ..................................................... G02F 1/1336
USPC ........................................................... 349/15
See application file for complete search history.

(56) References Cited

U.S. PATENT DOCUMENTS

| | | | |
|---|---|---|---|
| 5,745,203 A * | 4/1998 | Valliath | G02F 1/133553 349/113 |
| 6,101,008 A | 8/2000 | Popovich | |
| 6,233,071 B1 * | 5/2001 | Orr | G02B 5/0252 359/15 |
| 2004/0012831 A1 * | 1/2004 | Kim et al. | 359/15 |
| 2005/0001787 A1 | 1/2005 | Montgomery et al. | |
| 2008/0218459 A1 | 9/2008 | Kim et al. | |
| 2009/0153754 A1 | 6/2009 | Jung | |
| 2009/0213147 A1 | 8/2009 | Sagardoyburu et al. | |

FOREIGN PATENT DOCUMENTS

| | | |
|---|---|---|
| CN | 1607417 A | 4/2005 |
| GB | 2428128 A | 1/2007 |
| KR | 10-2005-0002587 A | 1/2005 |
| KR | 10-2008-0000798 A | 1/2008 |
| KR | 10-2008-0000800 A | 1/2008 |
| KR | 10-2008-0023415 A | 3/2008 |
| TW | 2009-31127 A | 7/2009 |

OTHER PUBLICATIONS

European Search Report dated Jun. 29, 2015, in European Application No. 11838148.2.
Office Action dated Mar. 25, 2014, in Taiwanese Application No. 100133784, filed Sep. 20, 2011.
(Continued)

*Primary Examiner* — Paul Lee
(74) *Attorney, Agent, or Firm* — Saliwanchik, Lloyd & Eisenschenk

(57) ABSTRACT

Disclosed is a dual-view display system. The dual-view display system includes a liquid crystal display panel, a backlight unit outputting a light to the liquid crystal display panel, and an optical device alternately guiding image lights output from the backlight unit in left and right directions of the liquid crystal display panel.

13 Claims, 3 Drawing Sheets

(56) References Cited

OTHER PUBLICATIONS

Office Action dated Mar. 25, 2014, in Taiwanese Application No. 100133784.

International Search Report in International Application No. PCT/KR2011/006054, filed Aug. 17, 2011.

Notice of Allowance dated Dec. 20, 2012 in Korean Application No. 10-2010-0108428, filed Nov. 2, 2010.

* cited by examiner

DUAL-VIEW DISPLAY SYSTEM COMPRISING A FIRST AND SECOND ELECTRO-HOLOGRAPHIC OPTICAL ELEMENT

CROSS-REFERENCE TO RELATED APPLICATIONS

This application is the U.S. national stage application of International Patent Application No. PCT/KR2011/006054, filed Aug. 17, 2011, which claims priority to Korean Application No. 10-2010-0108428, filed Nov. 2, 2010, the disclosures of each of which are incorporated herein by reference in their entirety.

TECHNICAL FIELD

The present application claims the benefit of priority under 35 U.S.C. 119 to Korean Patent Application No. 10-2010-0108428 filed on Month Day, Year which is hereby incorporated by reference in its entirety.

BACKGROUND ART

Display apparatuses to display images are classified into a liquid crystal display employing liquid crystal, a field emission display, a plasma display panel using the discharge of inert gas, and an organic light emitting diode display employing an organic light emitting diode.

Among them, the plasma display panel is applied to only a large-size TV. Meanwhile, the liquid crystal display and the organic light emitting diode display have been applied to various fields from small devices to large devices, such as cellular phones, portable computers, monitors, and TVs.

The liquid crystal display employs electrical and optical characteristics of the liquid crystal.

In detail, the liquid crystal has an anisotropic property in which property values such as values of a refractive index or a dielectric constant are different from each other according to long and short axes of molecules, so that the molecular alignment and an optical property can be easily adjusted.

In other words, the liquid crystal display adjusts light transmittance by changing the alignment of liquid crystal molecules according to the electric field to display images.

In detail, the liquid crystal display displays images through a liquid crystal display panel in which a plurality of pixels are arranged in the form of a matrix.

Each pixel of the liquid crystal display panel represents a desired color through the combination of red, green, and blue sub-pixels by adjusting light transmittance through the change of liquid crystal alignment according data signals.

Each sub-pixel is charged with a differential voltage between a data signal supplied to a pixel electrode through a thin film transistor and a common voltage supplied to a common electrode to drive the liquid crystal.

In addition, the liquid crystal display panel requires a backlight unit to supply a light to a rear surface of the liquid crystal display panel since the liquid crystal display panel is a non-emissive device.

However, the liquid crystal display panel cannot display different images through one screen without interference therebetween.

DISCLOSURE OF INVENTION

Technical Problem

The embodiment can display different images onto left and right viewing angle regions of a liquid crystal display panel without the interference between the images.

Solution to Problem

According to the embodiment, a dual-view display system includes a liquid crystal display panel, a backlight unit outputting a light to the liquid crystal display panel, and an optical device alternately guiding image lights output from the backlight unit in left and right directions of the liquid crystal display panel.

In addition, the optical device is interposed between the liquid crystal display panel and the backlight unit.

In addition, optical components output from the backlight unit are incident onto the liquid crystal display panel through optical paths which are bent at a predetermined angle through the optical device, and the liquid crystal display panel displays the image light traveling in the left and right directions thereof by the light traveled through the bent optical paths.

In addition, the optical device is mounted on a front surface of the liquid crystal display panel.

Further, the optical device bends an incident light at a predetermined angle and guides the incident light in an electrical on-state, and transmits the incident light in an electrical off-state.

In addition, the optical device has a stack structure of first and second devices including an Electro-HOE (Holographic Optical Element) to transmit an incident light in a state that an optical path of the incident light is not changed when the optical device is powered off, and to transmit the incident light in a state that the optical path of the incident light is changed when the optical device is powered on.

In addition, first and second image data to be displayed at left and right sides of the liquid crystal display panel, respectively, are repeatedly supplied to the liquid crystal display panel, and the first and second devices are repeatedly turned on/off, so that the first and second image data are displayed at the left and right sides of the liquid crystal display panel, respectively.

In addition, the image lights include first and second image lights, the first image light is output in the left direction of the liquid crystal display panel, and the second image light is output in the right direction of the liquid crystal display panel.

In addition, the dual-view display system further includes a first image signal processing unit to process a first image signal to output the first image signal to the liquid crystal display panel, and a second image signal processing unit to process a second image signal to output the second image signal to the liquid crystal display panel.

In addition, the first and second image signals are different from each other.

In addition, the dual-view display system further includes a first voice signal processing unit to process a first voice signal linked with the first image signal, and a second voice signal processing unit to process a second voice signal linked with the second image signal.

In addition, the dual-view display system further includes a first voice outputting unit to output the first voice signal processed in the first voice signal processing unit, and a second voice outputting unit to output the second voice signal processed in the second voice signal processing unit.

In addition, the first voice outputting unit is an ear-phone, and the second voice outputting unit is a speaker.

In addition, the liquid crystal display panel is mounted on one of a navigator, a TV, a laptop computer, a cellular phone, and an advertising board.

In addition, the optical device bends an incident light at a predetermined angle and guides the incident light when a first voltage is applied, and transmits the incident light when a second voltage greater than the first voltage is applied.

In addition, the optical device bends an incident light at a first angle in a left direction of the optical device to guide the incident light when a first voltage is applied, transmits the incident light when a second voltage lower than the first voltage is applied, and bends the incident light at the first angle in a right direction of the optical device to guide the incident light when a third voltage greater than the first and second voltages is applied.

In addition, the dual-view display system is employed in a glass-free type system.

According to the embodiment, a dual-view display system includes a liquid crystal display panel, a backlight unit outputting a light to the liquid crystal display panel, and an optical device interposed between the liquid crystal display panel and the backlight unit to change a traveling direction of the light output from the backlight unit and alternately guide the light in left and right directions of the liquid crystal display panel.

Advantageous Effects of Invention

As described above, according to the dual-view display system of the embodiment, two different images can be displayed on one liquid crystal display panel, so two viewers positioned at the left and right sides of the liquid crystal display panel can simultaneously view the different images without the crosstalk.

In addition, according to the dual-view display system of the embodiment, different mages can be displayed on left and right viewing angle regions of one screen of the liquid crystal display panel without interference therebetween.

In addition, according to the dual-view display system of the embodiment, different images can be simultaneously displayed, and voices linked with the images can be output through outputting units different from each other, so that noise and interference can be prevented.

BEST MODE FOR CARRYING OUT THE INVENTION

Hereinafter, embodiments will be described with reference to accompanying drawings.

Figure 1:
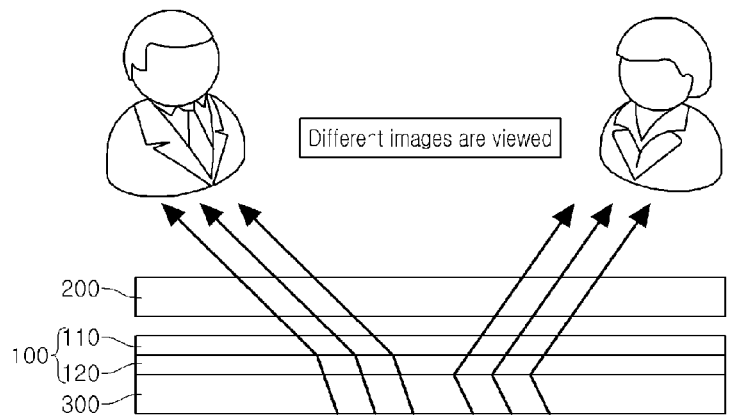
FIG. 1 is a schematic view showing a dual-view display system according to the embodiment.

FIG. 1 is a schematic view showing a dual-view display system according to the embodiment.

The dual-view display system enables a user to view two different images through one display panel.

In other words, as shown in FIG. 1, the dual-view display system includes a liquid crystal display panel 200, a backlight unit 300 to output lights to the liquid crystal display panel 200, and an optical device 100 interposed between the liquid crystal display panel 200 and the backlight unit 300 to change the direction of the lights output from the backlight unit 300 so that the lights alternately travel toward in left and right directions of the liquid crystal display panel 200.

Accordingly, the lights output from the backlight unit 300 pass through the optical device 100 so that the lights are alternately directed in the left and right directions of the liquid crystal display panel 200.

At this time, the paths of all optical components output from the backlight unit 300 may be bent at a predetermined angle while the optical components are passing through the optical device 100, and then the optical components are incident onto the liquid crystal display panel 200. Thus, image lights are produced in the left and right directions of the liquid crystal display panel 200 by the lights traveling through the bent optical paths.

Accordingly, the image lights are displayed in the left and right directions of the liquid crystal display panel 200.

In other words, first and second image lights are alternately displayed in the left and right directions of the liquid crystal display panel 200, so that a first viewer (a man of FIG. 1) positioned at the left side of the liquid crystal display panel 200 can view images by the first image lights displayed in the left direction of the liquid crystal display panel 200.

In addition, a second viewer (a woman of FIG. 1) positioned at the right side of the liquid crystal display panel 200 can view images by the second image lights displayed in the right direction of the liquid crystal display panel 200.

Therefore, the dual-view display system according to the embodiment can display two different images on one liquid crystal display panel, and the two viewers are positioned on the left and right sides of the liquid crystal display panel to simultaneously view different images without crosstalk therebetween.

Meanwhile, the optical device 100 may be realized to bend the incident lights at a predetermined angle and guide the lights in an electrical on-state, and to transmit the incident lights in an electrical off-state.

In other words, the optical device 100 may include Electro-HOEs (Holographic-Optical Element) 110 and 120 capable of electrically changing the traveling directions of the lights.

In addition, when a first voltage is applied, the optical device 100 bends the incident lights at a predetermined angel and guides the incident lights. When a second voltage greater than the first voltage is applied, the optical device 100 transmits the incident lights.

In addition, the optical device 100 bends the incident lights at a predetermined first angle in the left direction of the optical device 100 and guides the incident lights when the first voltage is applied. When the second voltage lower than the first voltage is applied, the optical device 100 transmits the incident lights. When a third voltage greater than the first and second voltages is applied, the optical device 100 bends the incident lights at the first angle in the right direction of the optical device 100 and guides the incident lights.

In this case, preferably, the first to third voltages are in the range of 0V to about 10V.

If the first to third voltages get out of the range of 0V to about 10V, the optical device 100 may not change the traveling direction of the lights.

In addition, preferably, first to third angles are in the range of about 45 to about 135.

If the first to third angles get out of the range of about 45 to about 135, viewers may not easily view images through the liquid crystal display panel 200.

For example, when the first voltage is 0V, the first angle may be set to about 45, so that the incident light may be bent at the angle of 45 in the left direction of the optical device 100 and guided.

In addition, when the second voltage is 5V, the incident light may be transmitted.

When the third voltage is about 10V, the third angle is set to about 135, so that the incident light may be bent at the angle of about 135 in the right direction of the optical device 100 and guided.

The liquid crystal display panel 200 may be preferably mounted on one of a navigator, a TV, a laptop computer, a cellular phone, or an advertising board.

Figure 2:
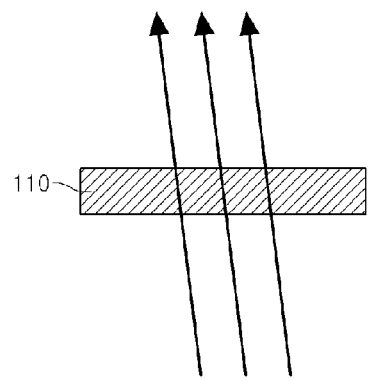
FIGS. 2 and 3 are schematic views showing the operation of a single Electro-HOE applied to the dual-view display system according to the embodiment.
Figure 3:
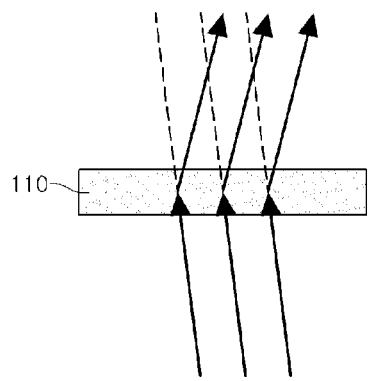
Figure 4:
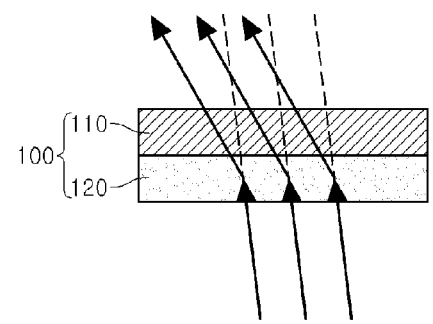
FIGS. 4 and 5 are schematic views showing the operation of a stack Electro-HOE applied to the dual-view display system according to the embodiment.
Figure 5:
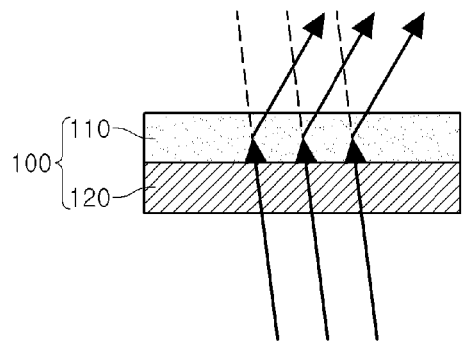

FIGS. 2 and 3 are schematic views showing the operation of a single Electro-HOE 110 applied to the dual-view display system according to the embodiment. FIGS. 4 and 5 are schematic views showing the operation of a stack Electro-HOE applied to the dual-view display system according to the embodiment.

As shown in FIG. 2, when the single Electro-HOE 110 is powered off, lights incident into the single Electro-HOE 110 are transmitted in the state that the paths of the lights are not changed. As shown in FIG. 3, when the single Electro-HOE 110 is powered on, the incident lights are transmitted in the state that the paths of the lights are changed.

As shown in FIG. 4, in the stack Electro-HOE including two single Electro-HOEs, if an Electro-HOE 120 is powered on, and the Electro-HOE 110 is powered off, the Electro-HOE 120 changes the paths of the lights in the left direction, and the Electro-HOE 110 transmits the lights in the state that the paths of the lights are changed in the left direction.

As shown in FIG. 5, if the Electro-HOE 120 is powered off, and the Electro-HOE 110 is powered on, the Electro-HOE 120 transmits lights, and the Electro-HOE 110 changes the paths of the lights in the right direction.

Therefore, the paths of the lights output from the stack Electro-HOE can be changed by powering on and off the single Electro-HOEs of the stack Electro-HOE.

Figure 6:
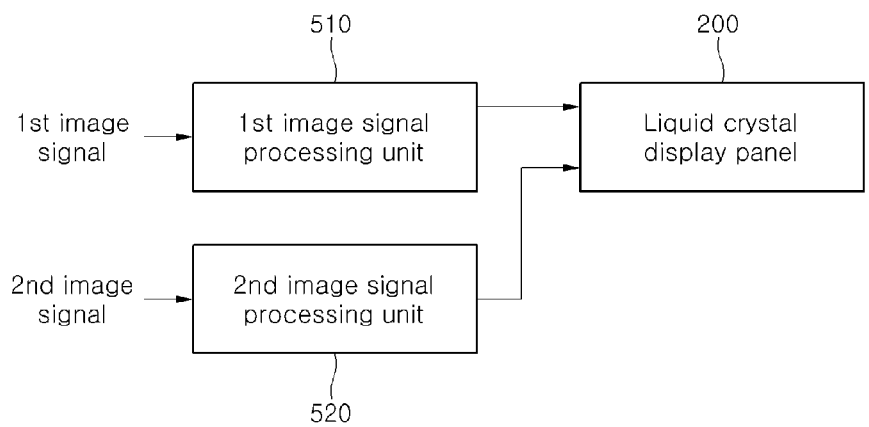
FIG. 6 is a block diagram schematically showing the dual-view display system according to the embodiment.
Figure 7:
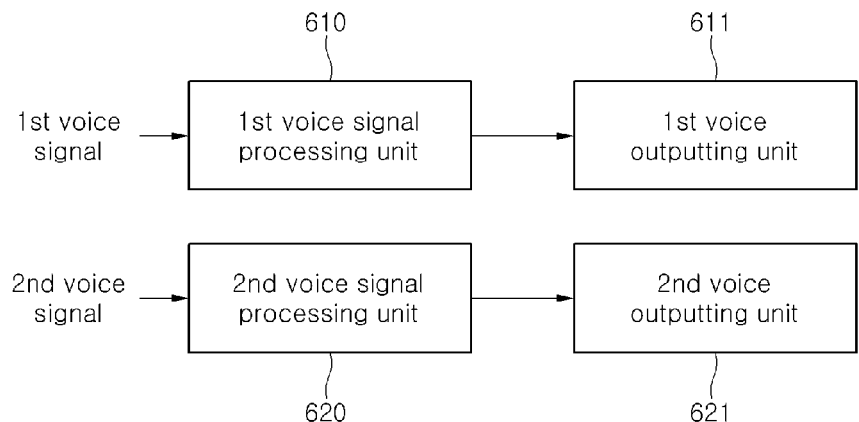
FIG. 7 is a block diagram schematically showing another example of the dual-view display system according to the embodiment.

FIG. 6 is a block diagram schematically showing the dual-view display system according to the embodiment, and FIG. 7 is a block diagram schematically showing another example of the dual-view display system according to the embodiment.

The dual-view display system according to the embodiment may include components to output two different images through the liquid crystal display panel 20.

In other words, as shown in FIG. 6, the dual-view display system includes a first image signal processing unit 510 to process first image signals to output the first image signals to the liquid crystal display panel 200 and a second image signal processing unit 520 to process second image signals to output the second image signals to the liquid crystal display panel 200.

In this case, preferably, the first and second image signals are different from each other.

Therefore, viewers of the dual-view display system according to the embodiment can view different images, which are displayed on the liquid crystal display panel 200, according to the positions of the viewers.

In addition, the dual-view display system according to the embodiment can output voices linked with the two different images.

In addition, as shown in FIG. 7, the dual-view display system includes a first voice signal processing unit 610 to process first voice signals linked with the first image signals and a second voice signal processing unit 620 to process second voice signals linked with the second image signals.

In addition, the dual-view display system further includes a first voice outputting unit 611 to output the first voice signals processed in the first voice signal processing unit 610 and a second voice outputting unit 621 to output the second voice signals processed in the second voice signal processing unit 620.

In this case, the first voice outputting unit 611 may include an ear-phone, and the second voice outputting unit 621 may include a speaker.

Therefore, the first voice signals linked with the first image signals and the second voice signals linked with the second image signals are output to the first and second voice outputting units 611 and 621, respectively, so that the dual-view display system according to the embodiment can simultaneously display different images, and output different voices linked with the images through different output units, respectively. Accordingly, noise and interference can be prevented.

Figure 8:
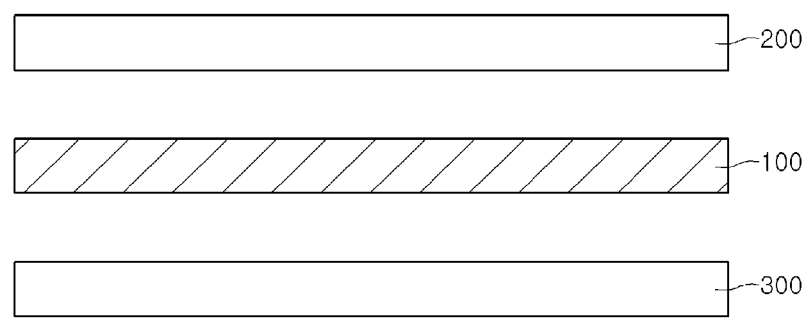
FIGS. 8 and 9 are schematic views showing an optical device provided in the dual-view display system according to the embodiment.
Figure 9:
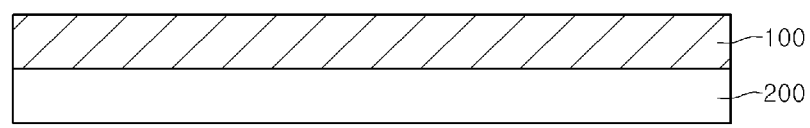

FIGS. 8 and 9 are schematic views showing an optical device provided in the dual-view display system according to the embodiment.

As described above, the optical device 100 alternately changes the traveling direction of lights into the left and right directions of the liquid crystal display panel 200 and guides the lights.

As shown in FIG. 8, the optical device 100 may be interposed between the liquid crystal display panel 200 and the backlight unit 300.

In other words, the optical device 100 changes the traveling directions of the lights output from the backlight unit 300 so that the liquid crystal display panel 200 can display image lights on left and right sides thereof.

In addition, as shown in FIG. 9, the optical device 100 may be installed at the front of the liquid crystal display panel 200.

In this case, the optical device 100 changes the traveling directions of image lights emitted from the liquid crystal display panel 200 so that the image lights are displayed in the changed directions.

Figure 10:
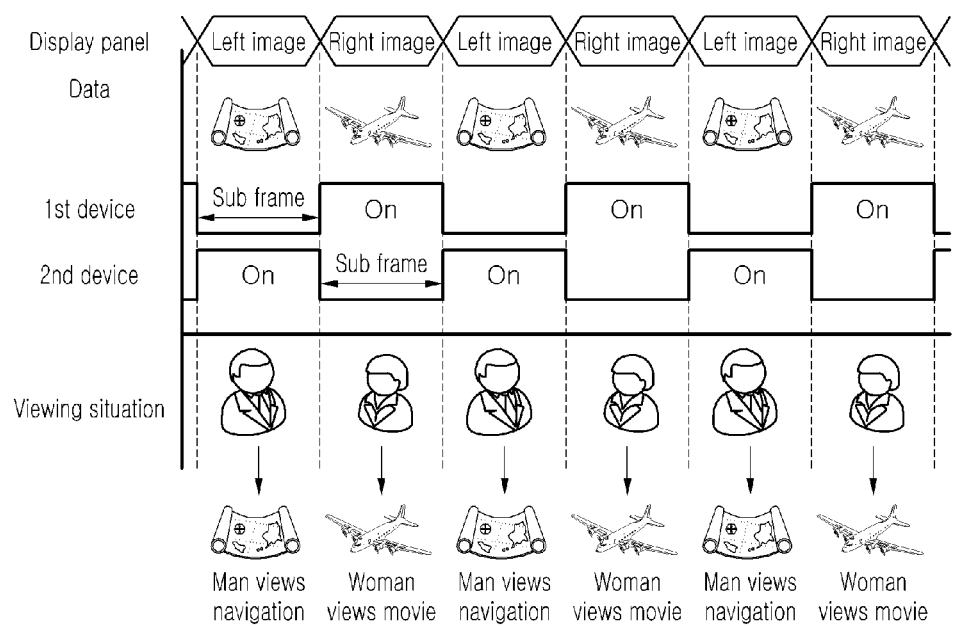
FIG. 10 is a timing diagram of a liquid crystal display panel and an optical device in the dual-view display system according to the embodiment.

FIG. 10 is a timing diagram of the liquid crystal display panel 200 and the optical device 100 in the dual-view display system according to the embodiment.

The optical device 100 includes the stack Electro-HOE in which first and second devices including two single Electro-HOEs shown in FIGS. 4 and 5 are stacked on each other.

If image data of the liquid crystal display panel 200 represent left images displayed in the left direction of the liquid crystal display panel 200 which are related to navigation, the first device may be turned off, and the second device may be turned on. In this case, the man positioned at the left side of the liquid crystal display panel 200 views the navigation image.

Thereafter, if image data of the liquid crystal display panel 200 represent right images displayed in the right direction of the liquid crystal display panel 200 which are related to a movie, the first device may be turned on, and the second device may be turned off. In this case, the woman positioned at the right side of the liquid crystal display panel 200 views the movie.

Thus, if image data related to navigation displayed in the left direction of the liquid crystal display panel 200 and image data related to the movie displayed in the right direction of the liquid crystal display panel 200 are repeatedly supplied to the liquid crystal display panel 200, and if the first and second devices are repeatedly turned on/off, images related to the navigation are displayed in the left direction of the liquid crystal display panel 200, and images related to the movie are displayed in the right direction of the liquid crystal display panel 200.

Therefore, if the dual-view display system according to the embodiment is a navigator installed in a vehicle, a driver can view an image related to the navigation, and an occupant on a passenger seat can view a DMB or a movie at the same time.

In addition, if the dual-view display system according to the embodiment is a TV installed at home, parents may view a drama and children may view an animation at the same time.

Accordingly, the dual-view display system according to the embodiment can display different images on left and right viewing angle regions of one screen of the liquid crystal display panel without interference.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. A dual-view display system comprising:
  a liquid crystal display panel;
  a backlight unit outputting a light to the liquid crystal display panel; and
  an optical device alternately guiding image lights output from the backlight unit in left and right directions of the liquid crystal display panel,
  wherein the optical device comprises
  a first device including a first Electro-HOE (Holographic Optical Element), and
  a second device disposed on the first device and including a second Electro-HOE (Holographic Optical Element),
  wherein the first device and the second device are alternately powered on and powered off.

2. The dual-view display system of claim 1, wherein the image lights guided from first device and the second device are different from each other.

3. The dual-view display system of claim 1, wherein the first device guides the image lights in the left direction of the liquid crystal display panel, and
  wherein the second device guides the image lights in the right direction of the liquid crystal display panel.

4. The dual-view display system of claim 1, wherein the first device is configured to transmit an incident light in a state that an optical path of the incident light is not changed when the first device is powered off, and to transmit the incident light in a state that the optical path of the incident light is changed in the left direction when the first device is powered on.

5. The dual-view display system of claim 1, wherein the second device is configured to transmit an incident light in a state that an optical path of the incident light is not changed when the second device is powered off, and to transmit the incident light in a state that the optical path of the incident light is changed in the right direction when the second device is powered on.

6. The dual-view display system of claim 1, wherein first and second image data to be displayed at left and right sides of the liquid crystal display panel, respectively, are repeatedly supplied to the liquid crystal display panel, and the first and second devices are repeatedly powered on/off, so that the first and second image data are displayed at the left and right sides of the liquid crystal display panel, respectively.

7. The dual-view display system of claim 1, wherein the image lights include first and second image lights, the first image light is output in the left direction of the liquid crystal display panel, and the second image light is output in the right direction of the liquid crystal display panel.

8. The dual-view display system of claim 1, further comprising:
  a first image signal processing unit to process a first image signal to output the first image signal to the liquid crystal display panel; and
  a second image signal processing unit to process a second image signal to output the second image signal to the liquid crystal display panel.

9. The dual-view display system of claim 8, wherein the first and second image signals are different from each other.

10. The dual-view display system of claim 8, further comprising:
  a first voice signal processing unit to process a first voice signal linked with the first image signal; and
  a second voice signal processing unit to process a second voice signal linked with the second image signal.

11. The dual-view display system of claim 10, further comprising:
  a first voice outputting unit to output the first voice signal processed in the first voice signal processing unit; and
  a second voice outputting unit to output the second voice signal processed in the second voice signal processing unit.

12. The dual-view display system of claim 11, wherein one of the first voice outputting unit and the second voice outputting unit is an ear-phone, and another of the first voice outputting unit and the second voice outputting unit is a speaker.

13. The dual-view display system of claim 1, wherein the liquid crystal display panel is mounted on one of a navigator, a TV, a laptop computer, a cellular phone, and an advertising board.

* * * * *